United States Patent [19]

Kilmer

[11] 4,367,587
[45] Jan. 11, 1983

[54] FILAMENT VEGETATION TRIMMER

[76] Inventor: Lauren G. Kilmer, 1927 E. 35 Pl., Tulsa, Okla. 74105

[21] Appl. No.: 215,180

[22] Filed: Dec. 11, 1980

Related U.S. Application Data

[63] Continuation-in-part of Ser. No. 958,519, Nov. 7, 1978, Pat. No. 4,265,019.

[51] Int. Cl.³ .......................................... A01D 50/00
[52] U.S. Cl. ........................................ 30/276; 56/12.7
[58] Field of Search .................... 30/276, 347; 56/12.7

[56] References Cited

U.S. PATENT DOCUMENTS

| 2,254,521 | 9/1941 | Gardner | |
| 3,664,102 | 5/1972 | Reber | 56/295 |
| 3,693,255 | 9/1972 | Langenstein | 30/276 |
| 3,708,967 | 1/1973 | Geist et al. | 56/12.7 |
| 3,826,068 | 7/1974 | Ballas | 56/12.7 |
| 3,831,278 | 8/1974 | Voglesonger | 30/276 |
| 3,877,146 | 4/1975 | Pittinger, Sr. | 30/276 |
| 3,928,911 | 12/1975 | Pittinger, Jr. | 30/276 |
| 4,054,992 | 10/1977 | Ballas | 30/276 |
| 4,091,536 | 5/1978 | Bartholomew | 30/276 |
| 4,118,864 | 10/1978 | Pittinger, Sr. et al. | 30/276 |
| 4,138,810 | 2/1979 | Pittinger, Sr. | 30/276 |
| 4,211,004 | 7/1980 | Woods | 30/276 |
| 4,211,005 | 7/1980 | Woods | 30/276 |

FOREIGN PATENT DOCUMENTS

| 6938265 | 9/1969 | Fed. Rep. of Germany | 56/12.7 |
| 1281450 | 12/1961 | France | 56/12.7 |

Primary Examiner—Jimmy C. Peters
Attorney, Agent, or Firm—Head, Johnson & Stevenson

[57] ABSTRACT

A filament type vegetation trimmer having a rotating hollow output shaft through which monofilament line projects beyond the gyrator trimming end providing cutting means to trim grass and weeds. A gyrator head is attached to the trimming end of the shaft and is provided with a bell-shaped opening therein off-center from the central axis of the gyrator head creating a fulcrum point to cause the filament to extend transversely and lie within a groove in the head to form a rotary whip for trimming. An alternate embodiment of the gyrator head includes a bell-shaped opening in the head coaxial with the shaft and having a filament directing means, such as a conical plug or screw, extending into the opening coaxial with the shaft to cause the filament to extend outward forming a rotary whip for trimming.

4 Claims, 12 Drawing Figures

FILAMENT VEGETATION TRIMMER

CROSS-REFERENCE TO RELATED APPLICATIONS

This is a continuation-in-part of U.S. application Ser. No. 958,519, filed Nov. 7, 1978 now U.S. Pat. No. 4,265,019 dated May 5, 1981.

BACKGROUND OF THE INVENTION

1. Field of the Invention

The present invention relates to a filament vegetation trimmer and, more particularly, to such a trimmer having a gyrator head with intrinsic means to cause the filament to extend outward to form a rotary whip for trimming.

2. Description of the Prior Art

Generally within a filament type rotary trimmer, a spool of filament is attached to a rotating head with a length of filament extending outwardly therefrom for engagement with the vegetation. It has been found that this type of configuration allows for the end of the length of filament to become frayed thereby greatly reducing the cutting efficiency of the trimmer. It has been found that if the spool of filament is mounted rigidly to the trimmer with a length of filament extending down through a rotating head then the rotation of the head relative to the stationary filament spool causes the end of the length of the filament to twist and untwist as it sweeps in a planar fashion and presents an ever changing surface to the vegetation to be cut. This results in an even wear surface and a tendency to become pointed which greatly increases the efficiency of the cutting.

A major problem confronting this configuration of the trimmer is finding suitable means to direct the length of filament transversely from the rotating head. Various means for accomplishing this have been devised with the most common being a transverse bar attached to the bottom portion of the rotating head and extending across the central axis of the opening through the head causing the filament to be directed transversely and in a planar manner when rotating. In order to improve cutting efficiency and manufacturing cost there is a need for an improved gyrating head with filament directing means without the need for a separate directing bar means.

SUMMARY OF THE INVENTION

A primary object of the present invention is to provide an improved gyrator head for use in a filament vegetation trimmer.

Another object of the present invention is to provide a gyrator head having intrinsic means to direct a length of filament transversely by the rotation of the head.

Another object of the present invention is to provide an improved gyrator head without the requirement of a transverse bar to direct the filament.

Another object of the present invention is to provide a one-piece gyrator head.

Other and further objects and novel features of the present invention will become apparent upon reading the application and viewing the drawings.

The present invention is generally comprised of a filament vegetation trimmer having a rotary drive and a hollow shaft attached to the drive means. A gyrator head is attached to the end of the shaft. The gyrator head has a bell-shaped opening therethrough and the trimmer is provided with means to supply the filament through the shaft and through the opening in the head. The improvement comprises intrinsic means intersecting a transverse groove within the gyrator head to cause the filament to extend outward to form a rotary whip for trimming.

One embodiment of the intrinsic means has the bell-shaped opening extending from a top portion of the gyrator head to a bottom portion thereof intersecting the transverse notch in the bottom portion of the head. The opening and the transverse notch are off center from the central axis of the gyro head. With this configuration, when the filament is twisted by the rotation of the gyrator head the oscillation of the filament automatically causes the length of filament to move up within the notch thereby being held rigidly within the groove in transverse relationship to the head without the requirement of a bar or other means to defect the filament.

An alternate embodiment of the intrinsic means has the bell-shaped opening centered with the shaft and provided with a filament directing means centrally therein. The filament directing means may be a conical shaped plug directing the filament into either portion of the groove or the filament directing means may be a simple screw or plug.

BRIEF DESCRIPTION OF THE DRAWINGS

FIG. 4 is a sectional view taken along line 5—5 of FIG. 3

DETAILED DESCRIPTION OF THE PREFERRED EMBODIMENTS

Figure 1:
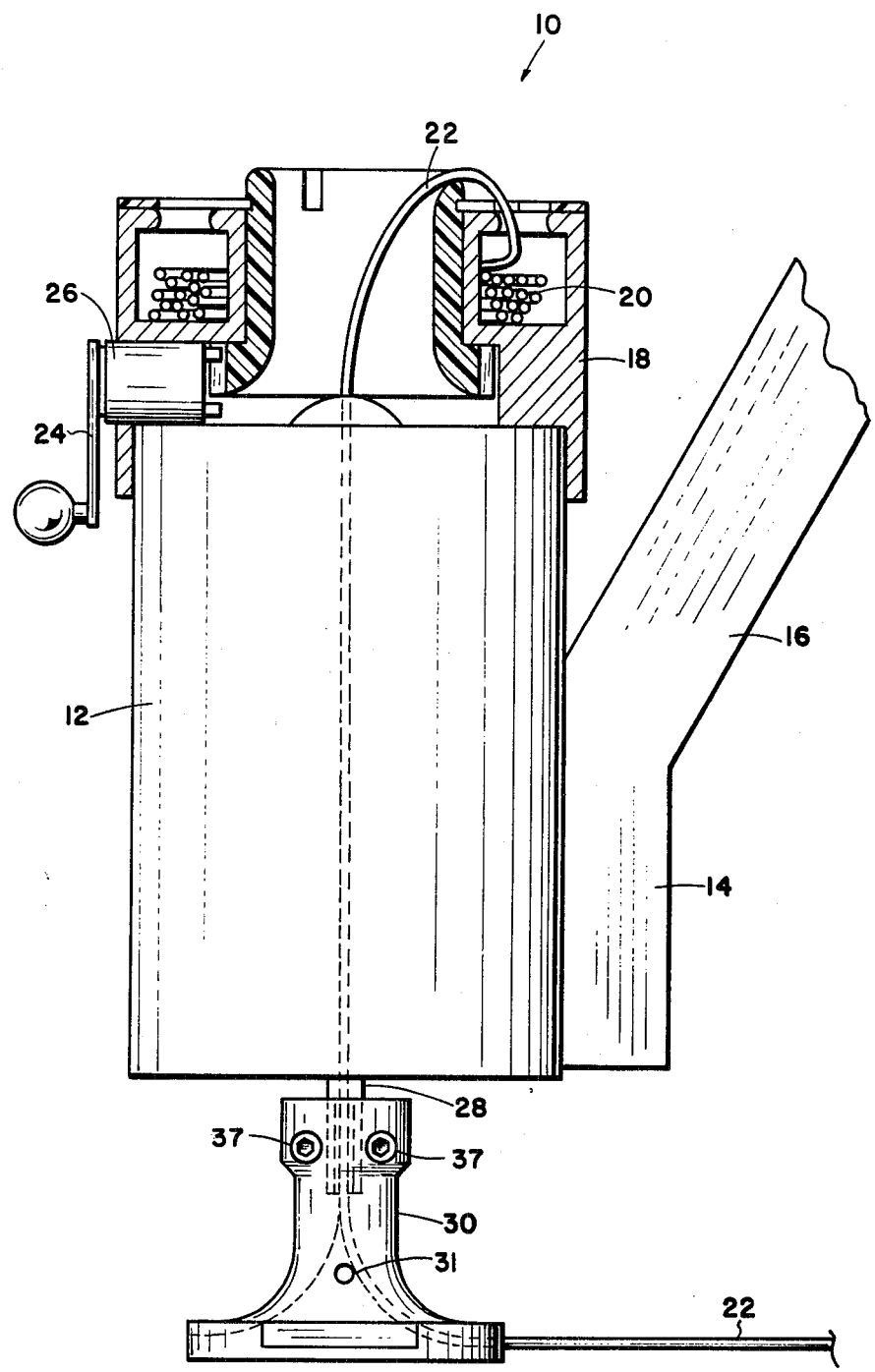
FIG. 1 is a perspective elevational view of a filament trimmer embodying the present invention.
Figure 6:
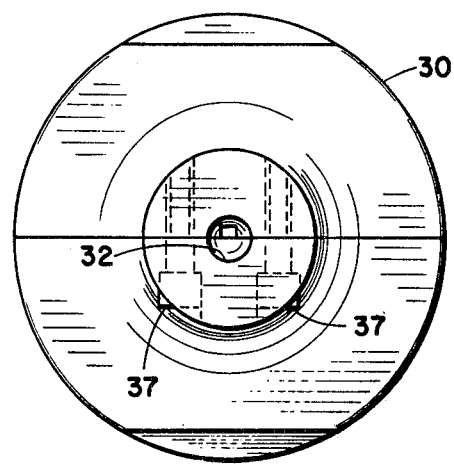
FIG. 6 is a top plan view of the gyrator head.

This application is an improvement upon the U.S. application Ser. No. 958,519 filed Nov. 7, 1978, incorporated herein by reference.

Referring to the drawings in detail, reference character 10 generally indicates an improved filament trimmer embodying the present invention. An electric motor 12 is mounted on a frame 14, which has a grip or handle 16 extending therefrom. A filament reserve chamber 18 is mounted above the motor 12 and is adapted for holding a coiled supply 20 of filament line 22, which may be selectively released by manual operation of a rotary handle 24 and drive means 26, as described in the above-mentioned prior application.

The filament 22 passes through a hollow output shaft 28, which in this embodiment comprises the axial shaft of the motor 12, into the gyrator head 30 through an opening therein and there beyond a sufficient distance for cutting or trimming.

Figure 7:
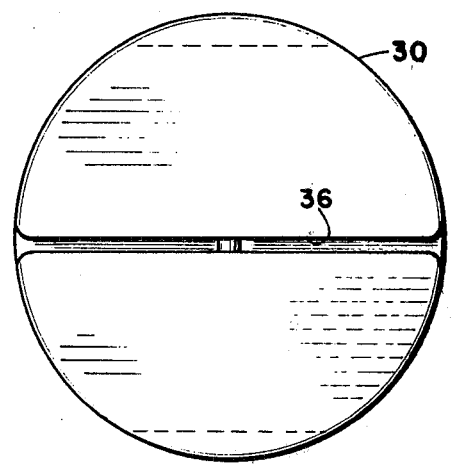
FIG. 7 is a bottom view of the gyrator head.
Figure 2:
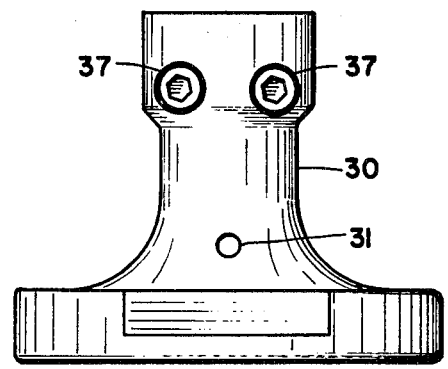
FIG. 2 is a side elevational view of a gyrator head embodying the present invention.
Figure 3:
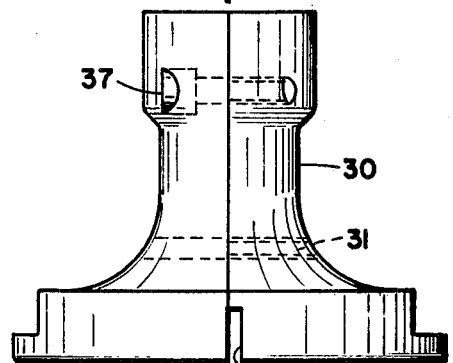
FIG. 3 is an elevational view of the gyrator head rotated 90° from FIG. 3.
Figure 4:
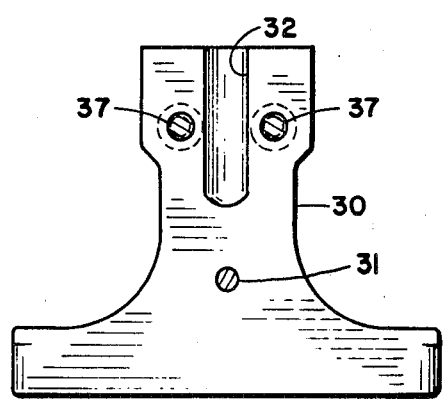
FIG. 4 is a sectional view taken along line 4—4 of FIG. 3.
Figure 5:
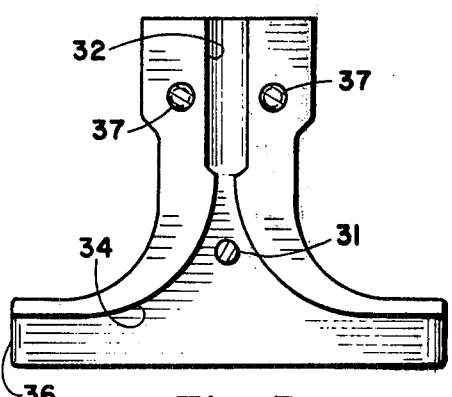
Figure 9:
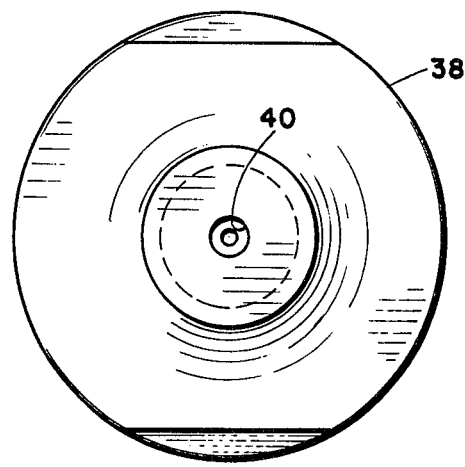
FIG. 9 is a top plan view of the gyrator head of FIG. 8.
Figure 11:
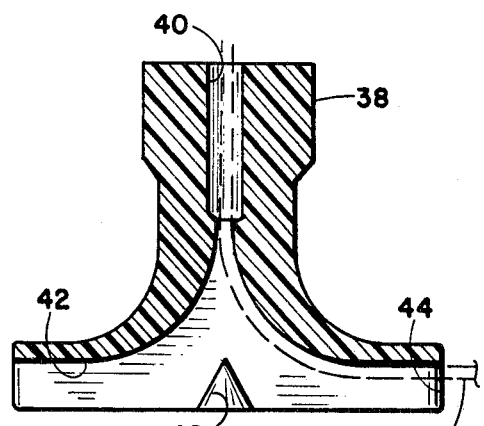
FIG. 11 is a sectional view taken along line 11—11 of FIG. 8.
Figure 8:
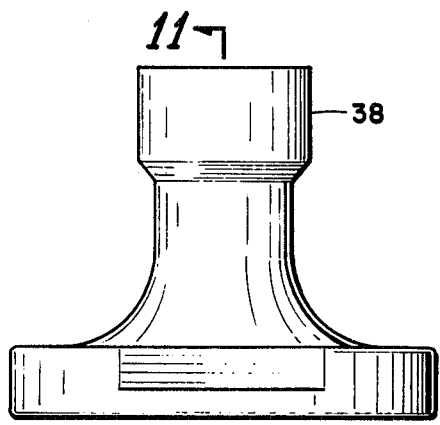
FIG. 8 is a side elevational view of an alternate embodiment of the gyrator head.
Figure 10:
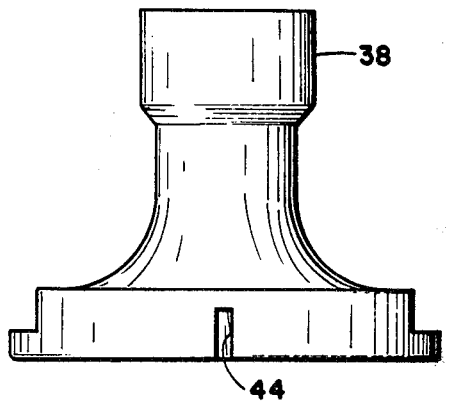
FIG. 10 is an elevational view of the gyrator head rotated 90° from FIG. 8.
Figure 12:
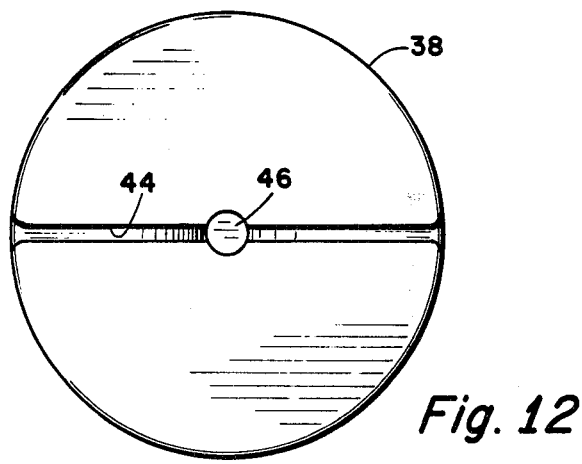
FIG. 12 is a bottom view of the gyrator head of FIG. 8.

The trimmer 10 is provided with novel intrinsic means to cause the filament line 22 to lie in a horizontal or transverse plane by the rotation of the head 30. The intrinsic means are defined as internal, non separate features within the head 30 which accomplish the desired results. One embodiment of the intrinsic means is as follows: the head 30, as shown in FIGS. 2, 3, 4, 5 and 6, has the shaft 28 extending into and secured within a central opening 32 therein. A lower portion of the central opening 32 extends into an internal bellshaped opening 34 within the head 30 which is displaced off-center from the central line of the head 30. As can be seen in FIGS. 3 and 7, the opening 34 intersects a transverse groove 36 in the bottom portion of the head 30. A pin 31 extends transversely across the central openings 32 and the internal bell shaped opening 34 leaving a space on each side thereof for the passage of the filament and to cause it to be directed into the off-set groove 36.

In operation, the electric motor 12, the shaft 28 and the head 30 rotate and the filament 22 will extend downward through the shaft 28 and into the openings 32 and 34 of the head 30. Due to the stationary relationship of the filament 22 to the rotating head 30, the filament 22 is caused to oscillate or twist and untwist. This twisting causes the filament 22 to extend through the bell-shaped opening 34 and to be held rigidly within the groove 36 in a horizontal or transverse plane. As can be seen, the filament 22 is free to twist and untwist while being retained in the groove 36 keeping the end sharp instead of split or frayed as is common with the filament trimmers of the prior art.

The gyrator head 30, as described above, may be molded as a one-piece unit from any suitable material such as metal, plastic, ceramic or the like. If desired, the gyrator head 30 may be formed in halves and assembled by means of screws 37 or any suitable means of construction.

An alternate embodiment of the present invention is shown in FIGS. 8–12, wherein a gyrator head 38 of any suitable shape, and shown in the following drawings in a bell-shaped configuration, is provided with a central upper opening 40 extending partially therein and adapted for receiving the output shaft 28 of the trimmer 10. The opening 40 extends into a central internal bell-shaped opening 42 within the head 38 with a portion thereof intersecting a transverse groove 44 in a lower portion of the top head 38. Coaxial with the openings 40 and 42 and extending partially into the groove 44 is a filament directing means 46. The filament directing means 46 may be a conical shaped plug, screw or any other suitable device to cause the filament 22 to be directed to either side thereof. The filament directing means 46 acts as a fulcrum to cause the filament 22 upon the rotation of the head 38 to extend upward and lie within the groove 44 in a horizontal or transverse plane to the trimmer 10.

This second embodiment of the intrinsic means of the present invention may be molded in one piece or may be formed from multiple pieces if desired. The filament directing means 46 may also be molded within the construction of this embodiment or may be added separately if desired.

It should be understood that while the descriptions above refer to a bell-shaped gyrator head, the exact shape of the head or configuration thereof may vary with different applications. For example, there may be no need for a separately defined head and output shaft.

Thus, the present invention in its alternate embodiments provides simple intrinsic means within a gyrator head to cause filament to automatically extend into a horizontal plane for best trimming results without the need for externally mounted transverse bars or members while allowing the important feature of the filament twisting and untwisting through the rotation of the head.

Wherein the present invention has been described with particular relation to the drawings attached hereto, it should be understood that other and further modifications, apart from those shown or suggested herein may be made within the scope and spirit of this invention.

What is claimed is:

1. A filament vegetation trimmer having a rotary drive means; a hollow shaft attached to the drive means, said shaft terminating at a gyrational end; a gyrator head, one end of which is attached to said gyrational end the other end forming a trimming end and having an outwardly curved axial opening therethrough to a transverse groove at the trimming end, and means to supply the filament from a non-rotatable supply source through said shaft and said opening to said gyrator head, the improvement comprising intrinsic means intersecting the groove and the axial opening to create a corridor to cause the filament to be maintained in said transverse groove and to extend outwardly forming a rotary whip for trimming.

2. A filament vegetation trimmer as in claim 1 wherein said transverse groove being off-center from the central axis of the said gyrator head.

3. A filament vegetation trimmer as in claim 1 wherein said intrinsic means being a conical plug, the apex of which is directed towards the axial opening.

4. A filament vegetation trimmer as in claim 1 wherein said intrinsic means includes a pin that extends transversely across said axial opening above the trimming end.

* * * * *